Patented May 3, 1927.

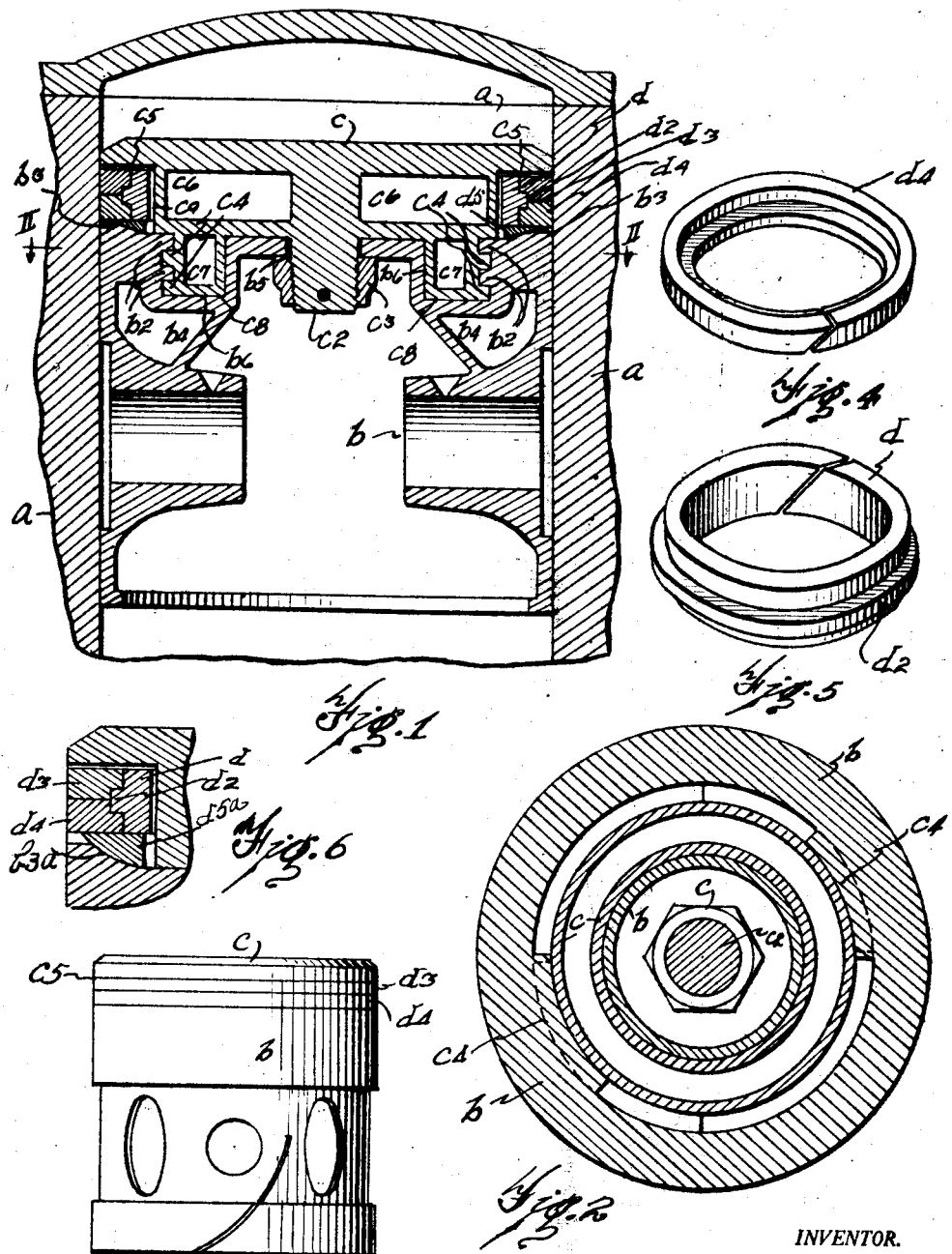

1,627,400

UNITED STATES PATENT OFFICE.

HENRY H. MEYER, OF DETROIT, MICHIGAN.

PISTON.

Application filed February 28, 1924. Serial No. 695,642.

My invention relates to pistons and has for a special object to provide an improved piston for internal combustion engines.

In previous constructions it has been necessary to strain the packing rings to a considerable extent from their normal shape to get them adjusted to position in the ring grooves on the piston. An object of my improvements is to avoid the necessity of distorting the rings. Another object is to secure improved packing rings. I secure these objects, among others, by the means illustrated in the accompanying drawing in which:—

Figure 1 is a vertical section of a piston embodying my invention, also showing a portion of the adjacent walls of the cylinder.

Fig. 2 is a section on the line II, II, Fig. 1.

Fig. 3 is an elevation of the piston.

Fig. 4 is a perspective view of one of the packing rings.

Fig. 5 is a perspective view of another of said packing rings.

Fig. 6 is a detail section showing a modified construction.

$a$ indicates the cylinder walls.

The piston is made up of two parts: the lower, $b$, and the upper $c$. The lower portion $b$ embodies the skirting and the bearings for the piston pin. The upper part $c$ forms the lower wall of the combustion chamber. The packing rings are held between the two portions, $b$ and $c$.

$b^4$ is an annular chamber cored in the part $b$, and serving to retard the flow of heat through the same. Said chamber extending above the bearings for the piston pin. $b^5$ is a circular opening coaxial with the part $b$ through the upper horizontal wall thereof. The part $c$ of the piston is provided with a cylindrical screw-threaded projection $c^2$ extended vertically downward from the center thereof and passing through the aperture $b^5$. $c^3$ is a nut, the threads of which engage with the threads of the projection $c^2$.

$b^6$ is an annular groove coaxial with the part $b$ and extending into the upper surface thereof. $b^2$ indicates partial, or interrupted, screw threads, (preferably 4), in the outer wall of the groove $b^6$. $c^8$ is an annular projection coaxial with the part $c$ of the piston, adapted to fit into the groove $b^6$ in the part $b$, and having partial, or interrupted, screw threads, $c^4$, adapted to pass downward between the ends of the partial thread $b^2$, and engage by a relative angular motion with their upper surfaces against the under surfaces of the threads $b^2$. $c^9$ is a cylindrical wall coaxial with the part $c$, of less diameter than said part and extending downward therefrom. $c^6$ is an annular chamber cored out in the part $c$, and $c^7$ is a similar chamber cored out in the projection $c^8$. These chambers serve to interrupt the flow of heat through the part $c$, and to protect the engaging surfaces of the partial thread, $c^4$, $b^2$, from the effects of high temperature and prevents the carbonization of the oil.

$d$ is a packing ring having the annular projection $d^2$ extending from the center of its outer surface. $d^3$ and $d^4$ are complementary packing rings shaped to engage against the outer surface of the ring $d$, and to engage between them the annular projection $d^2$, as shown.

$b^3$ is a conical surface extending around the upper end of the part $b$. $d^5$ is a split ring resting upon the surface $b^3$, and having its under surface shaped thereto.

All the above rings are of the usual elastic split-ring type.

The method of assembling the above described device is as follows, the parts $b$ and $c$ being separate:—

The ring $d^5$ is placed upon the conical surface $b^3$. The rings $d$, $d^3$, and $d^4$, are then arranged as shown in Fig. 1, and placed upon the upper horizontal surface of the ring $d^5$. The part $c$ is then adjusted to position, the annular projection, $c^8$, passing into the groove $b^6$. The part $c$ is then turned relative to the part $b$, so that the inclined upper surfaces of the partial threads, $c^4$, shall engage under the partial threads, $b^2$, and thus secure the part $c$ firmly in place, the shoulder $c^5$ engaging over the upper surfaces of the rings, $d$, $d^3$. The nut $c^3$ is then screwed into position and set up tightly to hold the whole in place.

Of course, the rings, $d$, $d^3$, $d^4$, may be placed upon the part $c$ around the cylindrical wall, $c^9$, and engaging the shoulder, $c^5$, before the parts are put in position, if desired.

Instead of the surface $b^3$ having straight elements in cross section, these may be curved and the ring fitted to it, as shown at $b^{3a}$, $d^{5a}$, Fig. 6.

What I claim is:—

1. In a piston, the combination of an upper and a lower part having adjacent ends and having a ring groove between said parts, an annular groove extending into one of said ends within its periphery, an annular projection from the other of said ends adapted to extend into said groove and engaging screw threads on said projection and wall of said groove.

2. In a piston, the combination of an upper and a lower part having adjacent ends and having a ring groove between said parts, an annular groove extending into one of said ends within its periphery, an annular projection from the other of said ends adapted to extend into said groove and engaging screw threads on said projection and wall of said groove, said projection being cored out to form a heat-obstructing chamber.

3. In a piston, the combination of an upper and a lower part having adjacent ends and having a ring groove between them, an annular groove extending into one of said ends within its periphery, an annular projection from the other of said ends adapted to extend into said groove, and partial screw threads on said projection and a wall of said groove adapted to permit said projection to pass into said groove and to engage said parts together by a relative angular movement of the same.

4. In a piston, the combination of an upper and a lower part having a ring groove between them, an annular groove in the surface of one of said parts, an annular projection in the surface of the other of said parts adapted to pass into said groove and engaging cam threads in adjacent walls of said groove and said projection, an aperture through the upper wall of one of said parts, a screw-threaded projection from the other of said parts passing through said aperture and a nut upon the end of said projection.

5. In a piston, the combination of two parts separate from each other and adapted to be removably engaged and to hold the packing rings in proper position between said parts, the engagement between said parts being within the inner surface of said rings, the upper part of said piston being cored out to form a heat-obstructing chamber between said engaging means and the heat-receiving surface of said part.

In testimony whereof, I sign this specification.

HENRY H. MEYER.